United States Patent [19]

Auriemma

[11] 4,061,368
[45] Dec. 6, 1977

[54] COUPLING FOR SPIRAL DRAIN PIPE

[76] Inventor: Robert Sinbad Auriemma, R.D. No. 1, P.O. Box 104, Bethel, Pa. 19507

[21] Appl. No.: 616,869

[22] Filed: Sept. 25, 1975

[51] Int. Cl.² ............................................. F16L 25/00
[52] U.S. Cl. ...................................... 285/383; 61/10; 285/390; 285/391; 285/DIG. 4
[58] Field of Search .......................... 61/10, 11, 12, 13; 285/DIG. 4, 383, 391, 355, 390

[56] References Cited

U.S. PATENT DOCUMENTS

| 1,518,014 | 12/1924 | Steen | 61/10 |
|---|---|---|---|
| 1,538,669 | 5/1925 | Smith | 61/10 |
| 2,746,486 | 5/1956 | Gratzmuller | 285/383 X |
| 3,565,464 | 2/1971 | Wolf | 285/DIG. 4 |
| 3,682,503 | 8/1972 | Bloom | 285/383 X |
| 3,785,682 | 1/1974 | Schaller et al. | 285/DIG. 4 |
| 3,897,090 | 7/1975 | Maroschak | 285/DIG. 4 |
| 3,903,928 | 9/1975 | Sykes et al. | 285/DIG. 4 |

FOREIGN PATENT DOCUMENTS 148,663  8/1920  United Kingdom .................. 285/383

Primary Examiner—Dennis L. Taylor
Attorney, Agent, or Firm—Thomas Hooker

[57] ABSTRACT

A coupling for joining spiral underground drainage pipes includes a cylinderical body with an inner circumferential flange and locking projections. When the coupling is rotated on to the drainage pipes the ends of the pipes are held flush on the flange and the inner surface of the flange forms a smooth continuation of the inner surfaces of the pipes.

7 Claims, 4 Drawing Figures

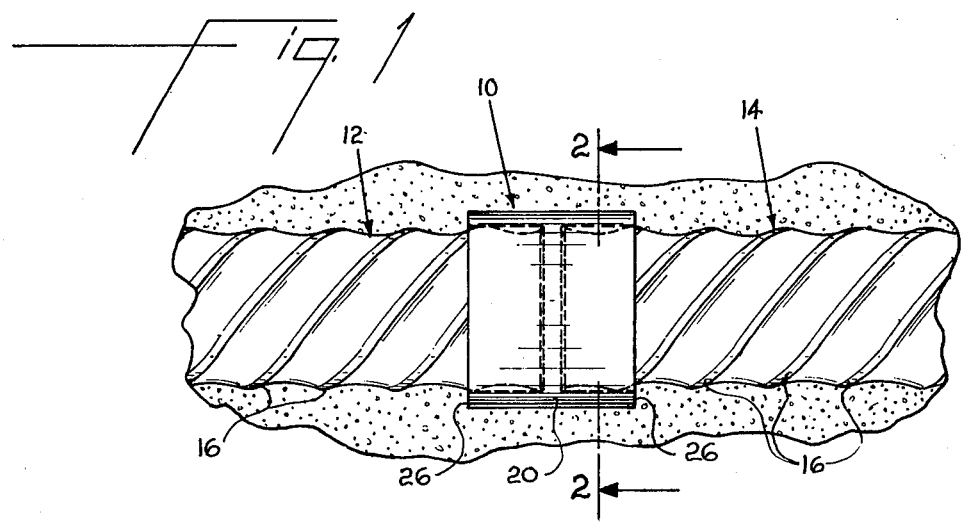
Fig. 1
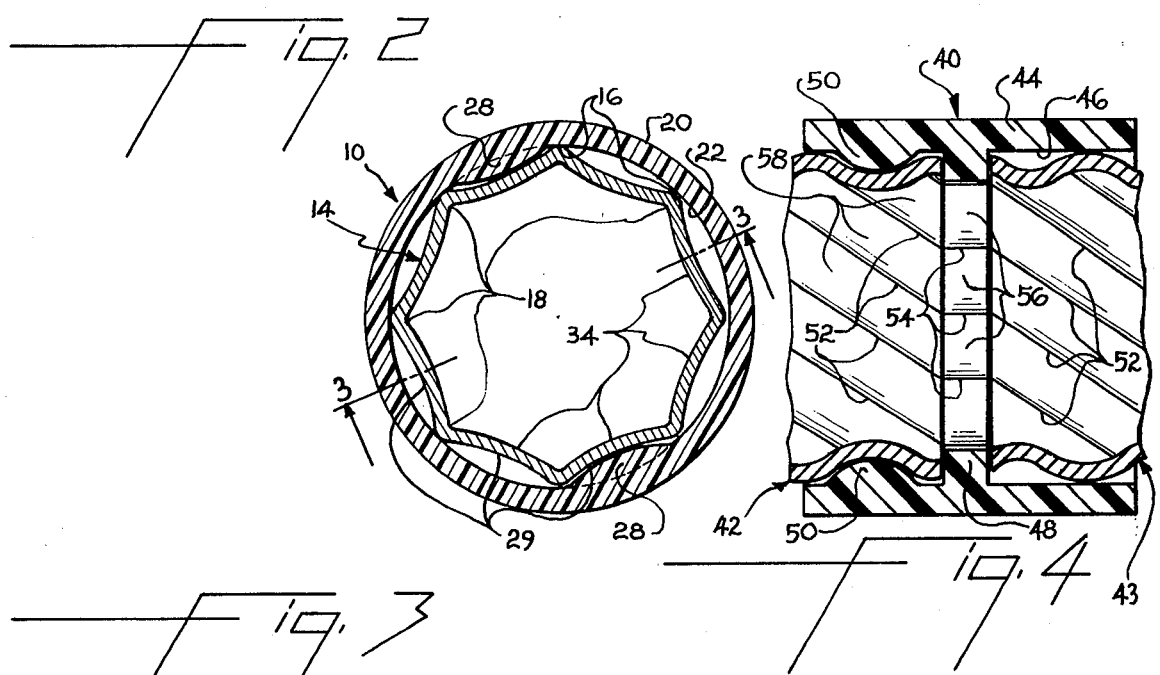
Fig. 2
Fig. 4
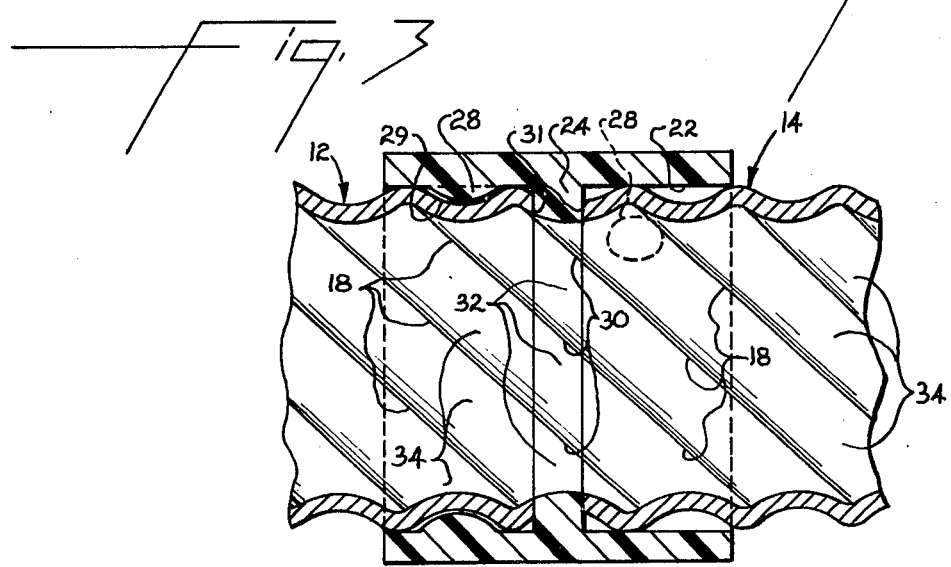
Fig. 3

COUPLING FOR SPIRAL DRAIN PIPE

The invention relates to a specialized coupling for joining spiral underground drainage pipes. Couplings for conventional underground drainage pipes are disclosed in U.S. Pat. Nos. 931,581, 1,058,683 1,508,683, and 2,116,165.

The coupling of the present invention has a cylinderical body with an inwardly facing circumferencial flange located midway between the ends of the body. The coupling is mounted on the ends of lengths of spiral drainage pipe and rotated with respect to the pipe to move locking projections on the inner surfaces of the body to either side of the flange along the recesses between flutes on the pipes so that the ends of the pipes are held flush against the sides of the flange. In one embodiment of the invention the inner surface of the flange includes crests and recesses extending angularly across the flange to form a smooth continuation of the crests and recesses on the inner surface of the pipes joined by the coupling. The locking projections are angularly spaced on the inner surface of the body to assure that the pipes are properly oriented when seated on the flange to assure continuity of the inner surface across the coupling.

In a second embodiment of the invention the crests and recesses on the circumferential flange extend along the axis of the coupling so that when the coupling is mounted on the lengths of underground drainage pipes the spiral inner surfaces include short axially extending crests and recesses which are continuous with the spirals on the two joined pipes.

In both embodiments of the invention the coupling locks both ends of the pipes flush against the circumfrencial flange. In this way, leakage is minimized. The continuation of the interior surface of the drainage pipe across the coupling does not restrict the flow of water through the pipe and reduces the possibility that solids carried by water conveyed along the drainage pipe collect at the junctions and, in time, build a dam which would restrict flow through the pipe. The coupling forms a strong joint between the two lengths of pipe and thus adds to the strength of the entire drainage line.

Other objects and features of the invention will become apparent as the description proceeds, especially when taken in conjunction with the accompanying drawings illustrating the invention, of which there is one sheet.

IN THE DRAWINGS:

FIG. 1 is a view illustrating the use of a coupling in accordance with the invention to join two spiral underground drain pipes;

FIG. 2 is a sectional view taken along 2—2 of FIG. 1;

FIG. 3 is a sectional view taken along 3—3 of FIG. 2; and

FIG. 4 is a sectional view similar to that of FIG. 3 illustrating a second embodiment of the invention.

As illustrated in FIGS. 1, 2, and 3, coupling 10 joins the ends of underground draninage pipes 12 and 14. The pipes 12 and 14 are of the spiral type in which a series of spiral flutes 16 extend along the exterior surfaces of the pipes and corresponding spiral recesses 18 extend along the interior surfaces of the pipes. Pipes 12 and 14 may be formed of metal, plastic or other suitable material.

The coupling 10 includes a cylinderical body 20 having an inner cylinderical surface 22. The ends of pipes 12 and 14 fit snugly within the surface 22 with flutes 16 on the surface. An inner circumferencial stop or flange 24 projects inwardly from surface 22 midway between the ends 26 of coupling 10. Pairs of opposed projections of dimples 28 extend from surface 22 to either side of flange 24. As shown in FIG. 2, the projections 28 fit within the recesses 29 between adjacent flutes at the ends of the pipes 12 and 14 extending into the coupling.

The coupling 10 is used to form a strong joint between two underground drain pipes within minimum leakage and minimum disturbance of the water carried by the pipes as it flows past the coupling. When the drain line is being installed the coupling is first mounted on the end of one pipe by moving an end 26 of the coupling over the end of the pipe so that the opposed dimples 28 are positioned within opposed recesses 29. The coupling is then rotated with respect to the pipe so that dimples are moved along their respective recesses away from the end of the pipe to seat pipe end 31 flush aganst one side wall of flange 24.

As illustrated in FIG. 3, when the coupling is rotated on the pipe the end surface 31 of the pipe is locked against flange 24 by engagement between the work surfaces on the projections and the sides of the pipe recesses 29 in which the projections are confined. The height of the work surfaces on the projections is less than or equal to the difference between the maximum height of the crests 32 of the flange and the minimum height of the recesses 30 on the flange. This relationship assures that the projections fit within the recesses yet permits a sliding engagement between the work surfaces and the exterior surface of the pipe as the end of the pipe is seated and locked against the adjacent flange sidewall. The flange limits insertion of pipe into the coupling.

Following mounting of the coupling 10 on a first pipe, the coupling is mounted on the end of the second pipe by piloting the end of the pipe into the open end of the coupling to position the projections 28 within the valleys or recesses 29 between adjacent flutes, following which the pipe is rotated into the coupling and locked against the other side wall of flange 24 as described previously.

As illustrated in FIG. 3, the interior or top surface of flange 24 includes recesses 30 extending across the flange at an angle to the axis of the coupling and pipes. The recesses 30 and crests 32 between them form continuations of the interior surfaces of the pipes so that, as illustrated, the spiral recesses and crests 18 and 34 of pipes 12 and 14 extend continuously from one pipe across the flange to the other pipe. The projections to either side of the flange are located circumferencially on the surface 22 so that the pipes are properly aligned when rotated into the coupling.

Underground drainage pipes commonly include a relatively large number of individual lengths of pipe secured together by couplings 10. The pipes frequently carry small solids such as stone chips, twigs or other particulate matter which are drawn into the pipes by the water carried by the pipes. These solids tend to collect at cracks or irregularities in the interior surface of the drainage line. Further, solids collect against the previously trapped solids so that with time a dam may form within the line restricting the flow of water through the line.

Coupling 10 does not restrict flow and reduces the possibility of solids forming an obstructing dam at the junction between joined pipes. Projections 28 hold the ends of the pipes flush against the flange so that particles cannot become trapped at the pipe-flange interfaces. Tight joints between the sides of flange 24 and the pipe end surfaces 31 reduce leakage at the coupling.

FIG. 4 illustrates a coupling 40 mounted on the ends of spiral underground drainage pipes 42 and 43 which are identical to pipes 12 and 14. Coupling 40 includes a cylindrical body 44 having an inner cylindrical surface 46 with a circumferencial stop or flange 48 located between the ends of the coupling. Projections or dimples 50 extend inwardly from surface 46 to either side of the flange 48 and are used to lock the ends of pipes 42 and 43 against the sides of the flange 48 in a similar manner as described in connection with coupling 10.

When pipes 42 and 44 are secured together by coupling 40 the ends of the recesses 52 in the pipes at flange 48 are located directly opposite each other and are joined by longitudinal or axial recesses 54 on the flange. Crests 56 between recesses 54 smoothly join the crests 58 between the recesses 52 on the pipes. With the ends of the pipe flush against the flange the inner surface of the flange forms a continuation of the inner surfaces of the pipes so that solids are not trapped at the coupling and obstructions cannot be built up in the pipe. Water flows unobstructed past the coupling.

Couplings 10 and 40 are preferably molded of plastic material but my be formed from other material if desired. In the molding operation there is an advantage in forming the coupling 40 in that the mold part used to form the inner surface of flange 56 may be withdrawn from the molded part along the artis of the part without rotation.

In the manufacture of coupling 10, the part must be rotated out of the molded part.

While the couplings are primarily intended for use joining underground drainage pipes, they may be used to join other kinds of pipe.

While I have illustrated and described preferred embodiments of my invention, it is understood that this is capable of modification, and I therefore do not wish to be limited to the precise details set forth, but desire to avail myself of such changes and alterations as fall within the purview of the following claims.

What I claim as my invention is:

1. A coupling for joining lengths of spiral pipe comprising a body having a cylindrical opening extending therethrough and defining an inner cylindrical surface, an interior flange projecting from the surface and extending at least partially around a circumference of the surface approximately midway between the ends of the opening, the flange including side walls extending inwardly from the surface and facing the ends of the opening and a top surface between the flange sidewalls made up of a series of sinuous recesses and crests extending along the length of the flange, and a pair of locking projections each projecting from the cylindrical surface, the flange being located between the projections, each projection extending a circumferencial distance around the cylindrical surface less than the circumferencial spacing between two adjacent recesses on the flange and a work surface located a distance from the surface equal to or less than the maximum height of the flange crests above the cylindrical surface less the minimum height of the flange recess above the cylindrical surface, the projections having a circumferencial extent less than the spacing between adjacent recesses on the flange, each projection lying on a spiral traced on said surface and extending through a crest on the flange whereby, upon rotation of lengths of spiral pipe into the ends of the coupling the projections fit within the exterior spiral recesses in the pipe and the work surfaces engage the recesses to hold the ends of the pipes flush against the side walls of the flange and in alignment with the flange crests and recesses.

2. A coupling as in claim 1 werein the crests and recesses on the flange extend across the width of the flange at an angle to the axis of the opening.

3. A coupling as in claim 1 werein the crests and recesses extend across the width of the flange parallel to axis of the opening.

4. A coupling as in claim 1 werein the flange extends around the opening.

5. A coupling as in claim 4 werein said projections comprise dimples.

6. A coupling as in claim 5 including a pair of opposed dimples to either side of the flange, the flange extending away from the circumferencial opening a distance greater than the distance the dimples project from the opening.

7. A coupling for mounting on the end of a spiral pipe, the coupling comprising a body having a cylindrical recess extending therein open at one end, a stop running at least partially around the circumference of the recess a distance away from the open end thereof, the stop including a side wall facing the open end and a top surface having a number of sinuous recesses and crests extending a distance from the side wall away from the open end of the recess, and a locking projection on the surface of the recess between the stop and the open end, the projection including a work surface located a distance from the surface of the recess equal to or less than the maximum height of the crests on the stop less the minimum height of the recesses on the stop, the projections having a circumferential extent less than the spacing between adjacent recesses on the stop, the projection lying on a spiral traced on the surface of the recess extending through a crest on the stop whereby upon insertion of a spiral pipe into the recess through the open end thereof and rotation of the pipe the work surface engages the outer surface of the pipe and holds the end thereof flush against the side wall of the stop so that the crests and recesses on the stop form a continuation of the crests and recesses on the interior of the spiral pipe.

* * * * *

UNITED STATES PATENT OFFICE
CERTIFICATE OF CORRECTION

PATENT NO. : 4,061,368
DATED : December 6, 1977
INVENTOR(S) : Robert Sinbad Auriemma It is certified that error appears in the above-identified patent and that said Letters Patent are hereby corrected as shown below:

In the Specification at column 1, line 6 delete "1,508,683,".

In the Claims at column 4, line 23 after "extends" insert --360°--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks